United States Patent
Richards et al.

(10) Patent No.: US 11,948,054 B2
(45) Date of Patent: Apr. 2, 2024

(54) MASKED PROJECTED GRADIENT TRANSFER ATTACKS

(71) Applicant: Booz Allen Hamilton Inc., McLean, VA (US)

(72) Inventors: Luke Edward Richards, Ellicott City, MD (US); Andre Tai Nguyen, Columbia, MD (US); Ryan Joseph Capps, Atlanta, GA (US); Edward Simon Paster Raff, Jamesville, NY (US)

(73) Assignee: BOOZ ALLEN HAMILTON INC., McLean, VA (US)

( * ) Notice: Subject to any disclaimer, the term of this patent is extended or adjusted under 35 U.S.C. 154(b) by 826 days.

(21) Appl. No.: 17/083,928

(22) Filed: Oct. 29, 2020

(65) Prior Publication Data

US 2022/0141251 A1    May 5, 2022

(51) Int. Cl.
*H04L 9/40* (2022.01)
*G06N 20/00* (2019.01)

(52) U.S. Cl.
CPC ......... *G06N 20/00* (2019.01); *H04L 63/1416* (2013.01); *H04L 63/1466* (2013.01)

(58) Field of Classification Search
CPC ........ G06F 18/214; G06F 18/22; G06F 17/18; G06F 21/52; G06F 21/566; G06F 21/577; G06F 40/205; G06N 3/045; G06N 3/084; G06N 3/063; G06N 20/00; H04L 63/1416; H04L 63/1425; H04L 63/1466; H04L 63/1441; H04L 43/04
See application file for complete search history.

(56) References Cited

U.S. PATENT DOCUMENTS

| | | | |
|---|---|---|---|
| 9,438,623 B1* | 9/2016 | Thioux | G06F 21/52 |
| 9,641,544 B1* | 5/2017 | Treat | H04L 43/04 |
| 9,973,531 B1* | 5/2018 | Thioux | H04L 63/1466 |
| 2021/0064785 A1* | 3/2021 | Liu | G06F 21/577 |
| 2021/0192357 A1* | 6/2021 | Sinha | G06N 3/084 |
| 2021/0319093 A1* | 10/2021 | Molloy | G06N 3/084 |

(Continued)

OTHER PUBLICATIONS

Anderson, H. S., et al., "EMBER: An Open Dataset for Training Static PE Malware Machine Learning Models", p. 2018. ArXiv e-prints URL http://arxiv.org/abs/1804. 04637.

(Continued)

*Primary Examiner* — Le H Luu
(74) *Attorney, Agent, or Firm* — BUCHANAN INGERSOLL & ROONEY PC

(57) ABSTRACT

A system and method for transferring an adversarial attack involving generating a surrogate model having an architecture and a dataset that mirrors at least one aspect of a target model of a target module, wherein the surrogate model includes a plurality of classes. The method involves generating a masked version of the surrogate model having fewer classes than the surrogate model by randomly selecting at least one class of the plurality of classes for removal. The method involves attacking the masked surrogate model to create a perturbed sample. The method involves generalizing the perturbed sample for use with the target module. The method involves transferring the perturbed sample to the target module to alter an operating parameter of the target model.

20 Claims, 8 Drawing Sheets

(56) References Cited

U.S. PATENT DOCUMENTS

| | | | | |
|---|---|---|---|---|
| 2021/0319784 | A1* | 10/2021 | Le Roux | H04L 63/1441 |
| 2021/0367961 | A1* | 11/2021 | Kuppa | G06F 40/205 |
| 2021/0383280 | A1* | 12/2021 | Shaloudegi | G06F 17/18 |
| 2022/0053005 | A1* | 2/2022 | Liu | G06F 18/22 |
| 2022/0070223 | A1* | 3/2022 | Deng | G06F 21/566 |
| 2022/0100850 | A1* | 3/2022 | Sun | G06N 20/00 |
| 2022/0351024 | A1* | 11/2022 | Khayrallah | G06N 3/063 |

OTHER PUBLICATIONS

Anderson, H. S., et al., "Evading Machine Learning Malware Detection", In Black Hat USA, URL https://www.blackhat.com/docs/us-17/thursday/us-17-Anderson-Bot-Vs-Bot-Evading-Machine-Learning-Malware-Detection-wp.pdf.
Arslan, B., et al., "Machine Learning Methods Used in Evaluations of Secure Biometric System Components", In 2017 16th IEEE International Conference on Machine Learning and Applications (ICMLA), 448-453. IEEE. ISBN 978-1-5386-1418-1. doi: 10.1109/ICMLA.2017.0-120. URL http://ieeexplore.ieee.org/document/8260672/.
Athalye, A., et al., "Obfuscated Gradients Give a False Sense of Security: Circumventing Defenses to Adversarial Examples. In International Conference on Machine Learning (ICML)", URL http://arxiv.org/abs/1802.00420.
Athalye, A., et al., "Synthesizing Robust Adversarial Examples", ArXiv e-prints ISSN 1938-7228. URL http://arxiv.org/abs/1707.07397.
Biggio, B., et al., "Security evalu-ation of pattern classifiers under attack", IEEE Transactions on Knowledge and Data Engineering, 2014, 26(4): 984-996. ISSN 10414347. doi:10.1109/TKDE.2013.57.
Biggio, B., et al., "Wild patterns: Ten years after the rise of adversarial machine learning", Pattern Recognition, 2018, 84: 317-331. ISSN 00313203. doi:10.1016/j.patcog.2018.07.023. URL https://linkinghub.elsevier.com/retrieve/pii/S0031320318302565.
Carlini, N., et al., "Adversarial Examples Are Not Easily Detected: Bypassing Ten Detection Methods", 2017, In Proceedings of the 10th ACM Workshop on Artificial Intelligence and Security, AISec '17, 3-14. New York, NY, USA: ACM. ISBN 978-1-4503-5202-4. doi:10.1145/3128572.3140444. URL http://doi.acm.org/10.1145/3128572.3140444.
Chang, W.-C., et al., "Taming Pretrained Transformers for Extreme Multi-Label Text Classification", In Proceedings of the 26th ACM SIGKDD International Conference on Knowledge Discovery & Data Mining, KDD '20, 3163-3171. New York, NY, USA: Association for Computing Machinery. ISBN 9781450379984. doi:10.1145/3394486.3403368.
Demontis, A., et al., "Why Do Adversarial Attacks Transfer? Explaining Transferability of Evasion and Poisoning Attacks", 2018, ArXiv e-prints 26-28. URL http://arxiv.org/abs/1809.02861.
Demontis, A., et al., "Why Do Adversarial Attacks Transfer? Explaining Transferability of Evasion and Poisoning Attacks.", 2019, In 28th USENIX Security Symposium (USENIX Security 19), 321-338. Santa Clara, CA: {USENIX} Association. ISBN 978-1-939133-06-9. URL https://www.usenix.org/conference/usenixsecurity19/presentation/demontis.
Dong, Y., et al., "Evading Defenses to Transferable Adversarial Examples by Translation-Invariant Attacks", 2019, In 2019 IEEE/CVF Conference on Computer Vision and Pattern Recognition (CVPR), 4307-4316. ISSN 2575-7075. doi:10.1109/CVPR.2019.00444.
Egele, M., et al., "A Survey on Automated Dynamic Malware Analysis Evasion and Counter-Evasion", 2017, In Proceedings of Reversing and Offensive-oriented Trends Symposium. ISBN 0360-0300. ISSN 03600300. doi:10.1145/2089125.2089126.
Finlayson, S. G., et al., "Adversarial Attacks Against Medical Deep Learning Systems", 2018, URL https://arxiv.org/abs/1804.05296.
He, K., et al., "Deep Residual Learning for Image Recognition", 2015, In IEEE Conference on Computer Vision and Pattern Recognition (CVPR).
Jain, H., et al., "Slice: Scalable Linear Extreme Classifiers Trained on 100 Million Labels for Related Searches", 2019, In Proceedings of the Twelfth ACM International Conference on Web Search and Data Mining, WSDM '19, 528-536. New York, NY, USA: Association for Computing Machinery.
Kariyappa, S., et al., "Improving Adversarial Robustness of Ensembles with Diversity Training", 2019, arXiv URL http://arxiv.org/abs/1901.09981.
Kingma, D. P., et al., "Adam: A Method for Stochastic Optimization", 2015, In International Conference on Learning Representations.
Kolosnjaji, B., et al., "Adversarial malware binaries: Evading deep learning for malware detection in executables", 2018, European Signal Processing Conference Sep. 2018: 533-537. ISSN 22195491. doi:10.23919/EUSIPCO.2018.8553214.
Kurakin, A., et al., "Adversarial Machine Learning at Scale", 2017, In International Conference on Learning Representations (ICLR). URL http://arxiv.org/abs/1611.01236.
Nguyen, A. T., et al., "Adversarial Attacks, Regression, and Numerical Stability Regularization", 2018, In AAAI 2019 Workshop on Engineering Dependable and Secure Machine Learning Systems.
Papernot, N., et al., "Practical Black-Box Attacks against Machine Learning", 2017, In Proceedings of the 2017 ACM on Asia Conference on Computer and Communications Security, ASIA CCS '17, 506-519. New York, NY, USA: Association for Computing Machinery.
Papernot, N., et al., "Transferability in Machine Learning: from Phenomena to Black-Box Attacks using Adversarial Samples", arXiv URL http://arxiv.org/abs/1605.07277.
Raff, E., et al., "Dr. AI, Where Did You Get Your Degree?", Artificial Intelligence in Health, 76-83. Cham: Springer International Publishing. ISBN 978-3-030-12738-1.
Salman, H., et al., "Do Adversarially Robust ImageNet Models Transfer Better?", 2020, arXiv URL http://arxiv.org/abs/2007.08489.
Sebastián, M., et al., "AVclass: A Tool for Massive Malware Labeling", Research in Attacks, Intrusions, and Defenses: 19th International Symposium, RAID 2016, 230-253. Paris, France: Springer International Publishing.
Sebastián, S., et al., "AVClass2: Massive Malware Tag Extraction from AV Labels", 2020, arXiv URL http://arxiv.org/abs/2006.10615.
Seideman, J., et al., "Identifying malware genera using the Jensen-Shannon distance between system call traces", In 2014 9th International Conference on Malicious and Unwanted Software: The Americas (MALWARE), 1-7. IEEE.
Shan, S., et al., "Fawkes: Protecting Privacy against Unauthorized Deep Learning Models", URL http://arxiv.org/abs/2002.
Srivastava, N., et al., "Dropout: A Simple Way to Prevent Neural Networks from Overfitting", The Journal of Machine Learning Research, 2014, 15(1): 1929-1958.
Srndic, N., et al., "Practical Evasion of a Learning-Based Classifier: A Case Study", In Proceedings of the 2014 IEEE Symposium on Security and Privacy, SP '14, 197-211. USA: IEEE Computer Society.
Suciu, O., et al., "When Does Machine Learning FAIL? Generalized Transferability for Evasion and Poisoning Attacks", In 27th USENIX Security Symposium (USENIX Security 18), 1299-1316. Baltimore, MD: {Usenix} Association.
Tramèr, F., et al., "The Space of Transferable Adversarial Examples", 2017, arXiv 1-15. URL http://arxiv.org/abs/1704.03453.
Wong, E., et al., "Fast is better than free: Revisiting adversarial training", In International Conference on Learning Representations (ICLR). URL http://arxiv.org/abs/2001.03994.
Xie, C., et al., "Improving Transferability of Adversarial Examples With Input Diversity", In 2019 IEEE/CVF Conference on Computer Vision and Pattern Recognition (CVPR), 2725-2734. ISSN 2575-7075. doi: 10.1109/CVPR.2019.00284.

(56) References Cited

OTHER PUBLICATIONS

Zhou, W., et al., "Transferable Adversarial Perturbations", 2018, ECCV, 471-486. Cham: Springer International Publishing. ISBN 978-3-030-01264-9.

* cited by examiner

US 11,948,054 B2

MASKED PROJECTED GRADIENT TRANSFER ATTACKS

FIELD

Embodiments relate to a system for generating a transfer adversarial attack by first generating a masked version of a surrogate model having fewer classes than the surrogate model, wherein the removal of classes is done randomly. This is done to randomly mask the classes of data and reduce label variance so as to provide for a transfer adversarial attack with more consistency and a higher confidence of success.

BACKGROUND INFORMATION

With conventional transfer attack models, the assumption is that the attacker knows more about the dataset than the architecture of the target. This assumption, however, is not reflective of real-world scenarios and leads to less than optimal attacks.

SUMMARY

Embodiments relate to a system for generating a transfer adversarial attack. The system includes an attack module configured to generate an adversarial attack on a target module. The attack module is configured to generate an attack on the surrogate model having an architecture and a dataset that mirrors at least one aspect of a target model of the target module, the surrogate model including a plurality of classes. The attack module is configured to generate a masked version of an attack on the surrogate model having masked class outputs by randomly selecting at least one class of the plurality of classes for removal. The attack module is configured to attack the masked surrogate model to create a perturbed sample. The attack module is configured to generalize the perturbed sample for use with the target module. The attack module is configured to transfer the perturbed sample to the target module to alter an operating parameter of the target model.

Embodiments also relate to a method for transferring an adversarial attack. The method involves generating a surrogate model having an architecture and a dataset that mirrors at least one aspect of a target model of a target module, the surrogate model including a plurality of classes. The method involves generating a masked version of an attack on the surrogate model having masked class outputs of the surrogate model by randomly selecting at least one class of the plurality of classes for removal. The method involves attacking the masked surrogate model to create a perturbed sample. The method involves generalizing the perturbed sample for use with the target module. The method involves transferring the perturbed sample to the target module to alter an operating parameter of the target model.

BRIEF DESCRIPTION OF THE DRAWINGS

Other features and advantages of the present disclosure will become more apparent upon reading the following detailed description in conjunction with the accompanying drawings, wherein like elements are designated by like numerals, and wherein.

DETAILED DESCRIPTION

Embodiments relate to a system for generating a transfer adversarial attack with more consistency and a higher confidence of success in order to better understand attacks and defend against them. Thus, while embodiments disclosed herein describe and illustrate an improved attack-transfer model, one skilled in the art will understand that such an improved attack-transfer model can be used to assist with developing and improving defenses.

In most attack scenarios, the attacker does not know what the exact architecture and dataset the target (or victim) is using, and thus makes assumptions about the target. Conventional wisdom is to assume perfect (or near perfect) knowledge about the target's dataset but imperfect knowledge about the target's architecture. Embodiments of the system disclosed herein, make the reverse assumptions. As will be demonstrated herein, designing an attack with the assumption that the attacker knows more about the target's architecture and less about the target's dataset provides for attacks having more consistency and a higher confidence of success.

In a real-world attack scenario, the attacker (if having imperfect knowledge of the target) generates a surrogate model that mirrors aspects of a target model. The surrogate model is attacked to generate perturbed samples. The perturbed samples are transferred to the target model to cause the target model to generate an incorrect output. This is known as a transfer attack. Conventional systems conduct transfer attacks by assuming to know more about the target's dataset and less about the target's architecture. Embodiments of the invention provide a means to conduct transfer attacks by assuming to know more about the target's architecture and less about the target's dataset. In doing so, additional variances are created that have to be addressed. These variances can be reduced by generating a masked surrogate model that has fewer classes of data (the removal of a class is determined randomly) than that of the surrogate model. This operation is referred to herein as "randomly masking the classes". Randomly masking classes makes it such that the attacker cannot rely on "easy" class sets to obtain a successful attack. Thus, the attacker is causes to attack the masked surrogate model and generate a perturbed sample from the masked surrogate model. This perturbed sample is then transferred to the target model. In addition to describing how to generate such an attack, the disclosure will provide test results demonstrating that use of such an attack scheme delivers a more consistent success rate.

Figure 1:
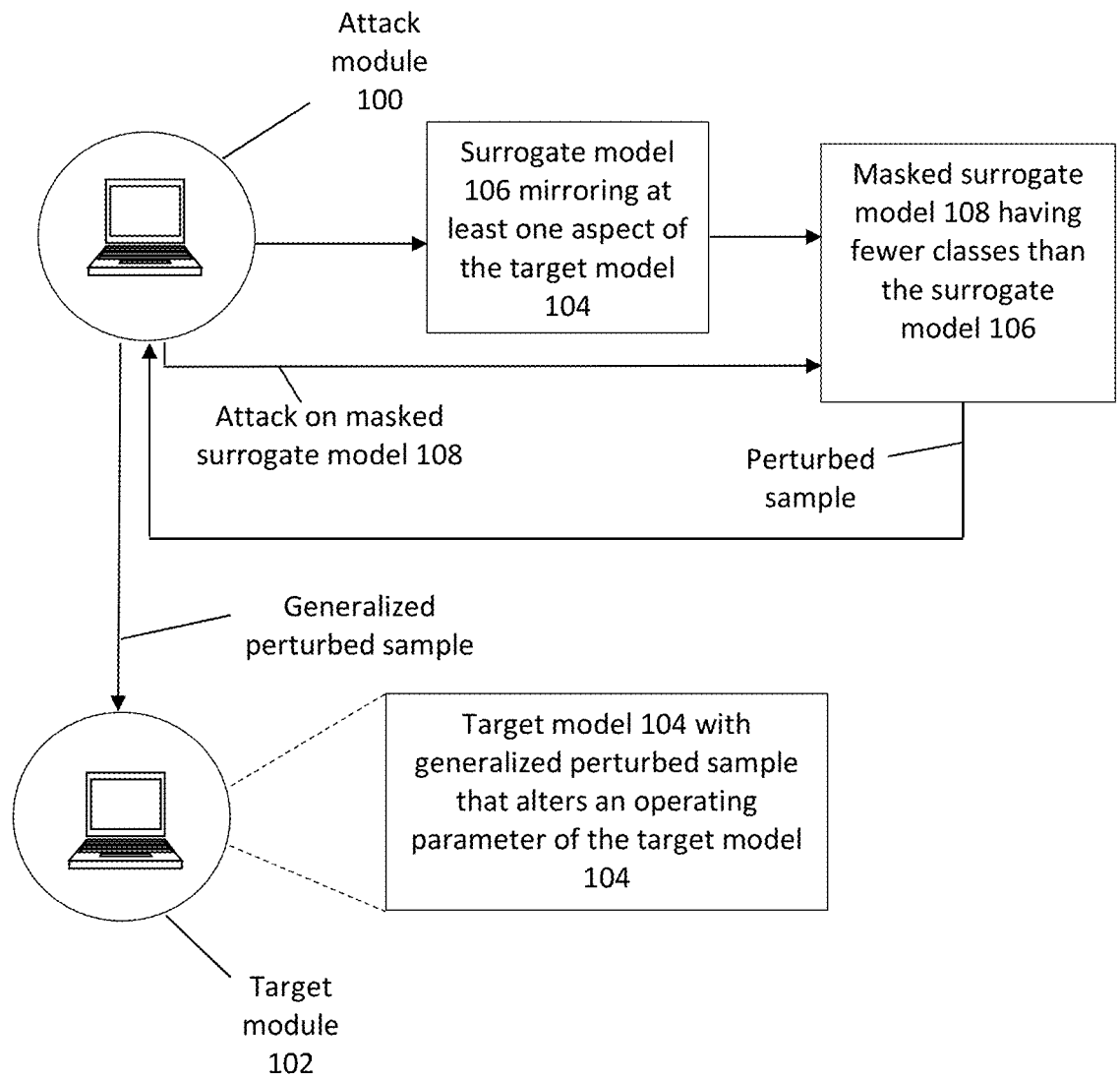
FIG. 1 is an exemplary flow diagram illustrating a transfer adversarial attack using an embodiment of the system and method.

FIG. 1 is an exemplary flow and system diagram illustrating a transfer adversarial attack using an embodiment of the system and method. The system includes an attack module 100, which can be a processor or a computer device, or a software module within the processor or computer device. In some embodiments, the system includes a target module 102, which can be a processor or a computer device, or a software module within the processor or computer device. The attack module 100 can be part of, or in communication with, a computer system. The target module 102 can be part of, or in communication with, a computer system, which may be the same or different computer system as that of the attack module 100. The attack module 100 develops and implements the attack on the target module 102.

A person having ordinary skill in the art would appreciate that embodiments of the disclosed subject matter can be practiced with various computer system configurations, including multi-core multiprocessor systems, minicomputers, mainframe computers, computers linked or clustered with distributed functions, as well as pervasive or miniature computers that can be embedded into virtually any device. For instance, one or more of the disclosed processors can be a hardware processor device with an associated memory.

A hardware processor device can be a single hardware processor, a plurality of hardware processors, or combinations thereof. Hardware processor devices can have one or more processor "cores." The term "non-transitory computer readable medium" as discussed herein is used to generally refer to tangible media such as a memory device.

Various embodiments of the present disclosure are described in terms of an exemplary computing device. After reading this description, it will become apparent to a person skilled in the relevant art how to implement the present disclosure using other computer systems and/or computer architectures. Although a set of operations can be described as a sequential process, some of the operations can in fact be performed in parallel, concurrently, and/or in a distributed environment, and with program code stored locally or remotely for access by single or multiprocessor machines. In addition, in some embodiments the order of operations can be rearranged without departing from the spirit of the disclosed subject matter.

A processor, as used herein, can be a special purpose or a general purpose processor device. The processor can be connected to a communications infrastructure, such as a bus, message queue, network, multi-core message-passing scheme, etc. An exemplary computing device, as used herein, can also include a memory (e.g., random access memory, read-only memory, etc.), and can also include one or more additional memories. The memory and the one or more additional memories can be read from and/or written to in a well-known manner.

In an embodiment, the memory and the one or more additional memories can be non-transitory computer readable recording media. Data stored in the exemplary computing device (e.g., in the memory) can be stored on any type of suitable computer readable media, such as a flash memory.

The data can be configured in any type of suitable database configuration, such as a relational database, a structured query language (SQL) database, a distributed database, an object database, etc. Suitable configurations and storage types will be apparent to persons having skill in the relevant art.

The computing device can also include a communications interface. The communications interface can be configured to allow software and data to be transferred between the computing device and external devices. Exemplary communications interfaces can include a modem, a network interface (e.g., an Ethernet card), a communications port, a PCMCIA slot and card, etc. Software and data transferred via the communications interface can be in the form of signals, which can be electronic, electromagnetic, optical, or other signals as will be apparent to persons having skill in the relevant art. The signals can travel via a communications path, which can be configured to carry the signals and can be implemented using wire, cable, fiber optics, a phone line, a cellular phone link, a radio frequency link, etc.

Memory semiconductors (e.g., DRAMs, etc.) can be means for providing software to the computing device. Computer programs (e.g., computer control logic) can be stored in the memory. Computer programs can also be received via the communications interface. Such computer programs, when executed, can enable the computing device to implement the present methods as discussed herein. In particular, the computer programs stored on a non-transitory computer-readable medium, when executed, can enable a hardware processor device to implement the exemplary methods, or similar methods, as discussed herein. Accordingly, such computer programs can represent controllers of the computing device.

Where the present disclosure is implemented using software, the software can be stored in a computer program product or non-transitory computer readable medium and loaded into the computing device using a removable storage drive or communications interface. Any computing device disclosed herein can also include a display interface that outputs display signals to a display unit, e.g., LCD screen, plasma screen, LED screen, DLP screen, CRT screen, etc.

The system can include an attack module 100. The attack module 100 is configured to generate an adversarial attack on a target module 102. This is done by the control of a user, automatically by the attack module 100, or by some combination thereof. It is contemplated for the type of attack to be a transferred attack, and thus the attack module 100 can configured to generate a surrogate model 106 having an architecture and a dataset that mirrors at least one aspect of a target model 104 of the target module 102.

The surrogate model 106 includes a plurality of classes. The surrogate model 106 is intended to be representative (at least partially) of the target model 104. As the target model 104 will have a plurality of classes, so too will the surrogate model 106. A class, as used herein, refers to a data class. A data class is a list of data set allocation attributes and their values, which can be represented by a data class definition. A data class definition contains identification and allocation information. To identify and refer to a data class, each one is assigned a unique name that contains from one to eight alphanumeric characters. Each data class also contains an optional 120-character description field for describing its contents.

Figure 2:
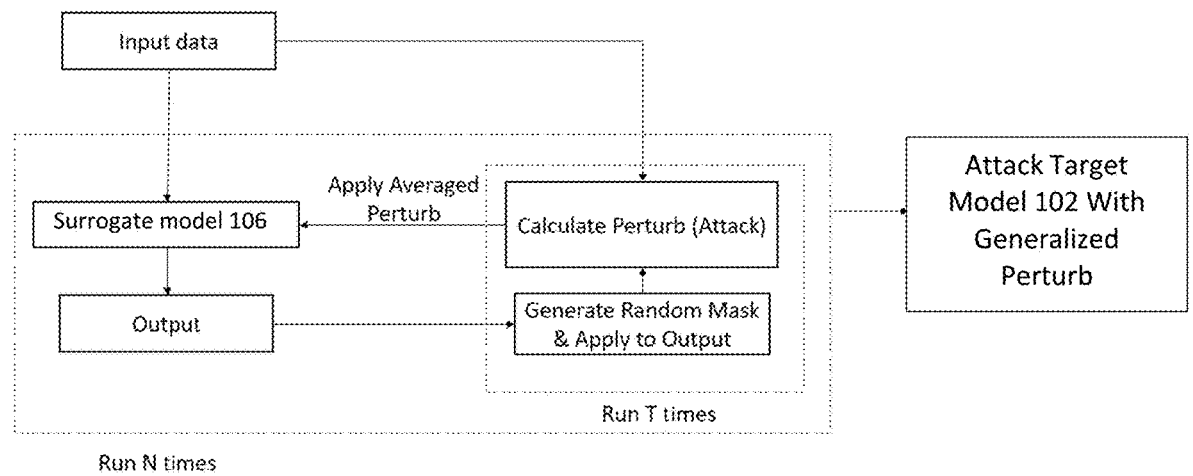
FIG. 2 is an exemplary flow diagram of the process of randomly masking classes of data in accordance with an exemplary masked projected gradient descent attack algorithm disclosed herein.

FIG. 2 is an exemplary flow diagram of the process of randomly masking classes of data in accordance with an exemplary masked projected gradient descent attack algorithm disclosed herein. The attack module 100 is configured to generate a masked version of the surrogate model 106 having fewer classes than the surrogate model 106 by randomly selecting at least one class of the plurality of classes for removal. The details of mask generation and randomly selecting a class for removal will be discussed in detail later.

The attack module 100 is configured to attack the masked surrogate model 108 to create a perturbed sample. The details of generating a perturbed sample will be discussed in detail later.

The attack module 100 is configured to generalize the perturbed sample for use with the target module 102

The attack module 100 is configured to transfer the perturbed sample to the target module 102 to alter an operating parameter of the target model 104.

The attack module includes program instructions stored within a memory having an algorithm as follows:

```
for n = 1...S do
    for i = 1...N do
        δ_avg = 0
        for j = 1...T do
            // Compute a random mask for logits of f_θ
            M = random mask
            // Apply mask, M to model output
            x_p = f_θ (x) · M
            δ = δ + α · sign(∇_δ ℓ (x_p + δ), y)) δ_avg = δ_avg + max(min(δ,
            ε), -ε)
        end
    end
    // Average the deltas found from random masks
    δ_avg = δ_avg /T
end
```

Explanation of the algorithmic steps and variables is as follows:
  for n=1 . . . S. This for loop initiates iterating, by the attack module 100, through all the data it is going to attack. S=total number of data points to attack.
  for i=1 . . . N. This for loop represents the number of iterations, as N is the number of iterations the attack module will use when carrying out the attack. More specifically, N=number of times to perturb each data point. A user of the attack module 100 determines what the N should be. Generally, the larger the N, the better, but this comes at a computational cost. It is contemplated for N to be 1,000.
  $\delta_{avg}$=one of N perturbations to a data point, and $\delta_{avg}$ is a calculation for determining by how much to perturb the data.
  for j=1 . . . T. This for loop represents the number of mask iterations, as T is the number of mask iterations. A user of the attack module determines what the T should be. Generally, the larger the T, the better, but this comes at a computational cost. It is contemplated for T to be 100.
  Compute a random mask for logits of $f_\theta$. This is where the random masking operation begins. When generating the random mask, it is assumed that the classes are unknown. This is done by randomly removing (excluding or ignoring) a subset of classes via $x_p=f_\theta(x) \cdot M$ Random exclusion is achieved by randomly ignoring a subset of classes that the surrogate model 106 is aware of. For instance, the algorithm can be set such that 50% of the data classes are randomly ignored. This random exclusion can be performed for each mask iteration.
  M=random mask (a perturbed data set). The mask is an overlay of a data set or class that has been perturbed. Thus, in a rudimentary example, if the data set is 010011, the mask may be 110011. The perturbation can be of a single data point each iteration, the same data point each iteration, a different data point each iteration, a plurality of data points each iteration, the same plurality of data points each iteration, a different plurality of data points each iteration, etc.
  $x_p$=the result or output of the surrogate model 106.
  $f_\theta$=any machine learning model, wherein θ=parameters of the model.
  $\delta=\delta+\alpha \cdot sign(\nabla_\delta(x_p+\delta), y)) \delta_{avg}=\delta_{avg}+max(min(\delta, \varepsilon), -\varepsilon)$ is the algorithmic step to determine by how much to perturb to generate $\delta_{avg}$.
  δ=the current perturbation—i.e., δ is changing the data to generate a perturbation.
  ε=a constant. ε is representative of how much to perturb the data by so that it is non-discernable but also fools the victim—i.e., ε is set to limit perturbation of data so that the perturbed sample is undetectable but causes the altered operating parameter in the target model 104. The max(min) function keeps the perturbation bonded by +ε and −ε.
  α=the learning rate. This is a constant.
  $\nabla_\delta$=the computed gradient with respect to δ perturbation.
  $\ell$ =a loss function. The loss function is representative of how the surrogate model 106 learns.
  Y=a class of data.

As noted above, the attack module 100 is configured to generate a surrogate model 106 having an architecture and a dataset that mirrors at least one aspect of a target model 104 of the target module 102. Mirroring, in this context, includes having a characteristic of the surrogate model 106 architecture and dataset that matches a characteristic of the target model 104 architecture and dataset. The degree of matching between the architecture of the surrogate model 106 and the architecture of the target model 104 is greater than the degree of matching between the dataset of the surrogate model 106 and the dataset of the target model 104.

It is contemplated for the attack on the masked surrogate model 108 to be a projected gradient descent attack. For instance, consider a target model 104 trained on an input distribution X with the corresponding label set L. Given an input example x with a corresponding label l, an adversarial example x' can be obtained from x by adding a very small perturbation to the original input such that x' is classified differently as compared to x. Gradient based adversarial attacks involve use of back-propagation algorithm techniques to develop adversarial examples. The technique usually involves using an error function to calculate the error between the desired output and the target model 104 output corresponding to a particular input. Keeping the input constant, the calculated error is used to compute the gradients corresponding to each parameter of the target model 104. These gradients can be used to update the parameters at each step taking into consideration a specific learning rate.

This process is used to develop a perturbation vector for the input by making a slight modification to the back-propagation algorithm. While back-propagating through the target module 102 the algorithm considers the model parameters to be constant and the input to be a variable. This allows for gradients corresponding to each element of the input to be obtained. These gradients are used to generate a perturbation vector, such that a new adversarial sample has a greater tendency towards being misclassified, provided that it is very similar to the input. Because the input gradients are used to obtain the perturbation vectors, these type of attacks are known as gradient based attacks.

In some embodiments, the target model 104 has an architecture and a dataset. The dataset includes a training dataset based on machine learning or deep learning.

In an exemplary embodiment, a method for transferring an adversarial attack involves generating a surrogate model 106 having an architecture and a dataset that mirrors at least one aspect of a target model 104 of a target module 102.

The surrogate model 106 includes a plurality of classes.

The method involves generating a masked version of the surrogate model 106 having fewer classes than the surrogate model 106 by randomly selecting at least one class of the plurality of classes for removal.

The method involves attacking the masked surrogate model 108 to create a perturbed sample.

The method involves generalizing the perturbed sample for use with the target module 102.

The method involves transferring the perturbed sample to the target module 102 to alter an operating parameter of the target model 104.

Generating the masked version of the surrogate model involves implementation of the following algorithm:

```
for n = 1...S do
    for i = 1...N do
        δ_avg = 0
        for j = 1...T do
            // Compute a random mask for logits of f_θ
            M = random mask
            // Apply mask, M to model output
            x_p = f_θ (x) · M
            δ = δ + α · sign(∇_δ ℓ (x_p + δ), y)) δ_avg = δ_avg + max(min(δ, ε), -ε)
        end
    end
    // Average the deltas found from random masks
    δ_avg = δ_avg /T
end
```

Wherein:
S=total number of data points to attack;
N=number of times to perturb each data point;
$\delta_{avg}$=one of N perturbations to a data point;
T=number of mask iterations;
$x_p$=the result or output of the surrogate model 106;
$f_\theta$=a machine learning model; $\theta$=parameters of the machine learning model;
$\delta$=a current perturbation;
$\alpha$=a constant;
$\varepsilon$=a constant;
$\nabla_\delta$=the computed gradient with respect to $\delta$ perturbation;
$\ell$=a loss function; and
Y=a class of data.

The surrogate model 106 having an architecture and a dataset that mirrors at least one aspect of a target model 104 of a target module 102 involves having a characteristic of the surrogate model 106 architecture and dataset that matches a characteristic of the target model 104 architecture and dataset. The degree of matching between the architecture of the surrogate model X and the architecture of the target model 104 is greater than the degree of matching between the dataset of the surrogate model 106 and the dataset of the target model 104.

The method involves attacking the masked surrogate model 108 via a projected gradient descent attack.

In some embodiments, the target model 104 has an architecture and a dataset. The dataset includes a training dataset based on machine learning or deep learning.

The method can involve estimating a likelihood of success for the attack on the target module 102. Determining the likelihood of success is explained in detail later.

The method can involve developing a defense model based on the attack on the target module 102. Because the inventive transfer adversarial attack has more consistency and a higher confidence of success, these attacks can be used to better train defense systems for the target module 102. As noted herein, the target model 104 can have a dataset including a training dataset based on machine learning or deep learning. Machine learning or deep learning techniques would be more efficient and accurate when learning from such inventive transfer attacks.

Examples

As noted herein, conventional transfer attack systems assume an unrealistic advantage for the attacker, wherein it is assumed that the attacker has the exact same training data as the victim. The inventors conducted experiments with a conventional attack and compared results with version of the inventive attack. Results show that the conventional adversarial transfer attack is less successful than previously thought. Imperfect knowledge of the victim's labels and data used both reduce transfer success. However, it will be shown that the adversary can remove the label variance as a factor of variance at the cost of 100× computational cycles.

Given an input $x \in \mathbb{R}^d$ and an associated label $y \in \mathcal{Y}$, the goal is to learn a model $V(\cdot)$ such that $V(x)=y$. This is achieved using gradient descent on a loss function $\ell(.,.)$ and trained over a dataset $\mathcal{D}^n$ of n samples to minimize the function $\Sigma_{\forall x, y \in D} \ell(V(x), y)$. The focus of the experiments is on adversarial attacks against the model $V(\cdot)$. For evasion attacks specifically, an adversary A will alter x to create a new perturbed sample $x^\sim = A(x)$. This perturbed $x^\sim$ is similar enough to x such that they should have the same label, but instead the victim $V(\cdot)$ is fooled so that $V(x^\sim) \neq y$. These attacks are surprisingly easy to accomplish. Just as model $V(\cdot)$ was trained by taking the gradient of the loss with respect to model parameters $\nabla_\theta \ell(V(x, y))$, the adversary can create $x^\sim$ by taking the gradient of the loss with respect to the input and attempting to maximize the loss (i.e., minimize $\nabla_{x^\sim} \ell(V(x, y))$).

In the ideal circumstance, the target module would be able to defend $V(\cdot)$ in a white box scenario, which means the adversary has perfect knowledge of the model $V(\cdot)$ including its parameters, as well as the training data $\mathcal{D}$. Another common scenario is the gray box attack, where the adversary A has imperfect knowledge, and so wishes to perform a transfer attack.

Figure 3:
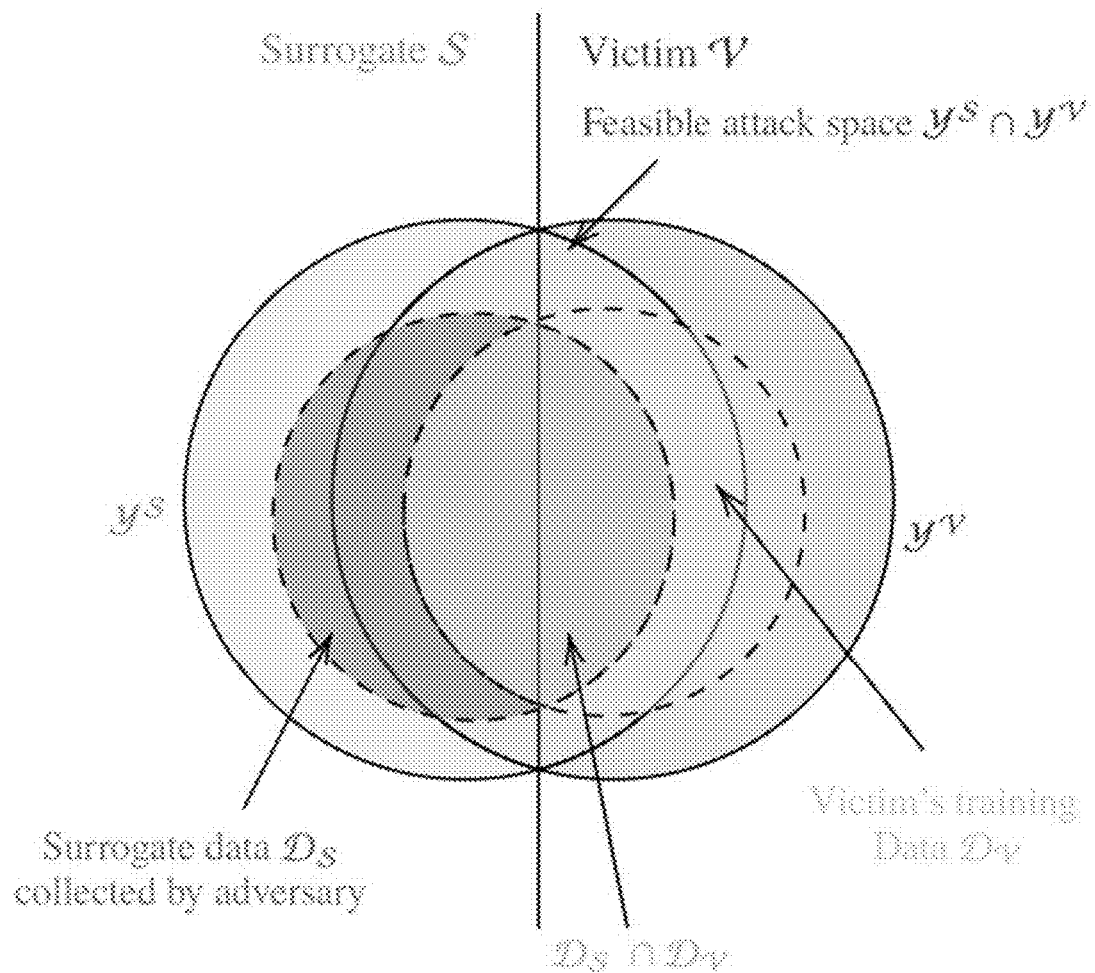
FIG. 3 is a Venn diagram of representing shared data when implementing an embodiment of the system and method.

FIG. 3 is a diagram illustrating a transfer attack where the adversary attacks their own surrogate model $S(\cdot)$ in order to evade a victim's model $V(\cdot)$. In the experiment, two factors that impact the attack success are studied. The overlap between the data $\mathcal{D}_S$ used to train $S(\cdot)$ and $\mathcal{D}_V$ used to train $V(\cdot)$ (dashed lines) exists in the sub-space of the overlap in label output spaces (solid lines) $S(\cdot): \rightarrow \mathcal{Y}^S$ and $V(\cdot): \rightarrow \mathcal{Y}^V$. These two factors may vary in their degree of overlap, and data may have no overlap. Some conventional systems assume a perfect intersection of all factors, making a "complete circle" of information known to the adversary.

In the transfer attack scenario the adversary A does not know what model the victim $V(\cdot)$ is using or its parameters, and so they construct a surrogate model $S(\cdot)$. This surrogate can have a different architecture, but is trained in the same manner: $\Sigma_{\forall x, y \in D} \ell(V(x), y)$. This gives the adversary their own model $S(\cdot)$, which they attack to produce an adversarial sample $x^\sim$. The hope, which has held in practice, is that attacks against the surrogate S(•) generalizes to the victim V(•) so as to be a successful tool in generating a result of V(x⁻)≠y.

As will be explained, the experimental results reveal an inconsistency in this threat model: in what realistic circumstance does the adversary A knows nothing about the victim's model V, yet have access to the exact same training dataset $\mathcal{D}$? This assumption is an unrealistic threat model for many real-world scenarios, yet it is the predominant version of the transferable attack scenario studied (Demontis et al. 2018; Salman et al. 2020; Tramèr et al. 2017; Papernot, McDaniel, and Goodfellow 2016; Demontis et al. 2019). Instead, as companies develop and label their own corpora, the more realistic assumption is for the adversary to likely know less about the data than they would the model type. Thus, the shared conditioning of the surrogate and victim being trained on the exact same data makes for an unrealistic evaluation.

The experiments focus on a new version of the transfer learning scenario. For simplicity, the experimental set up allows the surrogate S and victim V to use the same architecture when using different datasets $\mathcal{D}_S^n$ and $\mathcal{D}_V^n$. Since it is common practice to still use publicly available data, the study includes scenarios ranging from no overlap ($\mathcal{D}_S \cap \mathcal{D}_V = \emptyset$), partial overlap ($|\mathcal{D}_S \cap \mathcal{D}_V| < n$), and complete overlap ($\mathcal{D}_S = \mathcal{D}_V$). In addition, it is understood that companies may not fully expose all of the classes they might detect, so the study also evaluates how the degree of overlap between different output spaces $\mathcal{Y}^S$ and $\mathcal{Y}^V$ in the same fashion. In doing so, it is discovered that the lack of shared underlying data can significantly reduce the success of transfer attacks from the surrogate S(•) to the victim V(•). The study also evaluates use of an augmented "masked surrogate" attack the adversary can use to recover their efficacy against the unfortunate victim V(•), but it comes at the cost of a 100× increased computational burden.

While adversarial attacks on machine learning algorithms have received increased attention in the last few years, they have been a research area for over a decade (Biggio and Roli 2018) and have proven to be challenging to defend against (Carlini and Wagner 2017). The threat of adversarial attacks applies broadly to many classification use cases, for example malware detection (Kolosnjaji et al. 2018) and facial recognition (Shan et al. 2020), as well as to regression tasks (Nguyen and Raff 2018). The studies discussed herein focus on the transfer of adversarial attacks. There are two larger groups that transfer attacks have fallen into based on whether they use queries against the victim V(•) or not. The studies discussed herein relate to threat models that do not query the victim.

Many have looked at the transferability of adversarial attacks that do not rely on querying the victim model (Kariyappa and Qureshi 2019; Dong et al. 2019; Zhou et al. 2018; Salman et al. 2020; Tramèr et al. 2017; Xie et al. 2019) and built theory of how to improve transfer success rate (Demontis et al. 2018). All of these cited works assume, or do not discuss, the adversary having perfect knowledge of the victim's classes (i.e., $\mathcal{Y}^S = \mathcal{Y}^V$). The few works that have recognized that shared data ($\mathcal{D}_S = \mathcal{D}_V$) is an unrealistic assumption have not studied how the degree of data overlap may impact transfer success, and none have studied class overlap. Some have intentionally made sure there is no data overlap, but not tested the impact of no or partial overlap (Srndic and Laskov 2014). Others have performed tests against commercial systems with an unknown amount of class overlap, but still provide no study of how this impacts attack success. The studies discussed herein are the first to evaluate the impact of class overlap and the first to evaluate how the degree of data overlap impacts transfer success, and the interaction of these two factors.

Many black-box attacks query the victim (Papernot, McDaniel, and Goodfellow 2016; Papernot et al. 2017; Demontis et al. 2018) with new data points to get them labeled. This means that each label pair in the surrogate's corpus x, y∈$\mathcal{D}_S$ is really x, V(x). While the attacker is limited based on the number of queries considered, they are implicitly gaining information about the entire training set $\mathcal{D}_V$ that was used to create V(•). The query based black-box attacks are generally realistic threat models, but make it difficult to study the impact of shared data and label information between the victim and adversary. This is because the use of V(x) by the adversary makes it difficult to quantify the degree of shared information, and is confounded by the impact of queries being targeted to attack a specific instance x and the effectiveness of the adversary's query strategy. Query based attacks also do not allow for a comprehensive understanding of situations where the victim cannot be queried.

Known work that recognizes the adversary may have varied degrees of knowledge or overlap with $\mathcal{D}_V$ was by Suciu et al. (2018). Their study, however, was focused on only poisoning based attacks, and did not explore the broader impact of the degree of overlap $|\mathcal{D}_S \cap \mathcal{D}_V|/\max(|\mathcal{D}_S|, |\mathcal{D}_V|)$. Instead they choose to allow the adversary to know 70% of the training corpus or 100%. Instead, the studies discussed herein test a spectrum of overlaps of training data and class labels.

No work has yet considered that the adversary may not know the exact set of classes $\mathcal{Y}^V$ used by the victim, and so must use an overlapping but different set of labels $\mathcal{Y}^S$ for their surrogate model. Despite this, the scenario is realistic and important. Determining what family of malware (i.e., the class) a given executable belongs to is important functionality, yet all AV products have wildly different sets of labels they recognize with different definitions, which are constantly changing as new families are detected (Sebastian et al. 2016; Seideman, Khan, and Vargas 2014; Sebastian and Caballero 2020). The malware example is particular motivating because it involves a real-live adversary (the malware author) who actively wants to avoid detection. Embodiments of the invention that include a model of unknown class overlap is also realistic to common industry practice. Many companies will have alpha/beta tests or "phantom" deployments of hidden features for testing, which could include new class labels that have not been exposed. Even under normal circumstances, companies do not always disclose all classes they recognize or precisely how many exist. Real-world production models can have millions and even 100 million classes in use (Chang et al. 2020; Jain et al. 2019), making it impractical for an adversary to likely model all available classes. While the studies discussed herein do not test to this extreme, it is believed that this provides further evidence of that assuming a perfect model of the output space $\mathcal{Y}^V$ is not always realistic.

For the study, an explicit the threat model is made that defines the adversary's goals, capabilities, and knowledge. It is assumed there is a victim model V(•) that the adversary wishes to provide altered inputs x⁻=A(x) such that V(x⁻) will produce incorrect predictions. The adversary is able to send altered inputs x⁻ to the victim, but is not able to observe a direct or indirect response. The adversary does not know the training data $\mathcal{D}_V$ used by the victim, or the specific classes—it is only inferred guesses or availability that they should overlap to an unknown degree (this is realistic for cases of malware, medical, and other applications). The adversary has the capability to perturb inputs by up to $\epsilon$ under the $\infty$ norm, such that $\|\tilde{x}-x\|_\infty \leq \epsilon$ by attacking their own surrogate model $S(\bullet)$ trained on an independently built corpus $\mathcal{D}_S$ with an independent label set $\mathcal{Y}^S$. It is also assumed that the adversary's surrogate model $S(\bullet)$ uses the exact same architecture as the victim's $V(\bullet)$ (given wide re-use of "backbone" networks such as ResNet, this is a reasonable assumption).

The restrictions on the adversary's knowledge of the data and classes may seem extreme. This requires the adversary to invest time into understanding their victim, building their own corpus and expected label set, and then producing perturbed inputs to send to the victim. This scenario is realistic to many situations, and occurs in biometric recognition (Arslan, Ulker, and Sagiroglu 2017), medicine (Finlayson, Kohane, and Beam 2018; Raff, Lantzy, and Maier 2019), and malware detection (Anderson and Roth 2018; Egele et al. 2017). These are all domains where the specific class labels may vary between users but have predictable high-level goals, data is tightly held (for privacy or competitive advantage), and models are often kept private or not fully exposed to users/consumers.

Within the threat model, it is assumed that there are varying levels of intersection between the data points of $\mathcal{D}_S$ and $\mathcal{D}_V$. Within this analysis splits are made based on a number of shared classes for image classification $\mathcal{Y}=y_1, y_2, \ldots, y_N$ where each model is trained using classes a subset of $\mathcal{Y}$, the surrogate having $\mathcal{Y}^S$ and the victim $\mathcal{Y}^V$. Where the shared classes of $\mathcal{Y}^S \cap \mathcal{Y}^V = \mathcal{Y}^X$ represents the overlap in shared classes. Various sizes of intersection $|\mathcal{Y}^X|$ within the work respective to the size of $|\mathcal{Y}|$ are observed. Because the test involves varying levels of class overlap, each model ($V(\bullet)$ and $S(\bullet)$) has half as many output classes. For example, CIFAR-100 tests would only have 50 classes so that the number of shared classes can be varied from 2% to 100% without changing the number of classes.

Within that intersection of shared classes, the intersection is split further by dividing the data points of classes $\mathcal{Y}^X$ based on a varying number of data partitions such that the data points $\mathcal{Y}_X$ into subsets such that $\mathcal{Y}_S \neq \mathcal{Y}_V$. Thus, the surrogate model is $\mathcal{Y}_S = \mathcal{Y}_S \cup \mathcal{Y}_X$ and the victim model is $\mathcal{Y}_V = \mathcal{Y}_V \cup \mathcal{Y}_X$. Situations where there is no overlap in shared data points but shared classes exist $\mathcal{Y}_S \cap \mathcal{Y}_V = \emptyset$, the case in which there is partial overlap of data points $|\mathcal{Y}_S \cap \mathcal{Y}_V| < n$, and the case in which there it total overlap $\mathcal{Y}_S = \mathcal{Y}_V$ are studied.

To better study the impact of shared data ratio $|\mathcal{Y}_X|/\max(|\mathcal{Y}_S|, |\mathcal{Y}_V|)$ between the surrogate $S(\bullet)$ and victim $V(\bullet)$, less than all of the original training data is used. Instead, each model is trained only on half of the original samples (e.g., using 30,000 out of the 60,000 training samples of MNIST). This is done so that a shared class overlap of {0, 25, 50, 75, 100}% is tested while keeping the total training size constant, eliminating it as a factor of variation. For example, 0% overlap (i.e., $|\mathcal{Y}_X|/\max(|\mathcal{Y}_S|, |\mathcal{Y}_V|)=0$), would mean all of the original data is used, half by the surrogate S and the other half by the victim V. For 100% overlap, only half of the original data is used by both $S(\bullet)$ and $V(\bullet)$. At 50% overlap, 75% percent of the original data is used. One 25% portion for $S(\bullet)$ is used, a second 25% portion for $V(\bullet)$ is used, and a third 25% is used by both $S(\bullet)$ and $V(\bullet)$. This way all models trained have a corpus of the same total size. A consequence of this design choice is that the results are not directly comparable with prior studies on the same datasets, since the models used in the current studies are trained on only half as much data.

Once both models are trained on their respective datasets, the study proceeds by finding an adversarial attack A in which the input x is permuted to be $\tilde{x}=A(x)$ for the surrogate model $S(\bullet)$. This attack A is then transferred to the victim model $V(\bullet)$, which A is not optimized for. The success of such a transfer attack is measured by the original accuracy of the victim model on the shared held out test data $\mathcal{D}_X$ subtracted from the new accuracy after A permutes $\mathcal{D}_X$, $A(\mathcal{D}_X)$, wherein: success=accuracy($V(\bullet)$, $\mathcal{D}_X$)−accuracy($V(\bullet)$, $A(\mathcal{D}_X)$)).

This metric allows for the examination of how dependent the adversarial attack A is on the data of the surrogate $\mathcal{D}_S$. Common thought from the machine learning community would assume the closer the overlap in data distribution there is between $\mathcal{D}_S$ and $\mathcal{D}_V$, the more successful the attack will be. The studies examine how well this initial hypothesis holds with empirical evidence.

The studies discussed herein examine a variation of the threat model in which both the surrogate model and the victim model are hardened to adversarial attacks during training. Each model is then exposed to adversary examples $\tilde{x}_S$ generated by $A_S$ for model $S(\bullet)$ to have $S(\tilde{x}_S)$ y. The same process is used for $V(\bullet)$ to emulate the victim also attempting to safeguard the model. The goal is to then have a hardened version of the model such that $S(\tilde{x}_S)=y$ despite the attempted adversarial attack To explore the dependence of classes being present within the surrogate model $\mathcal{Y}^S$, the inventors introduce a modified projected gradient descent (PGD) attack. This is embodied in the following algorithm (annotated as Algorithm 1).

---

Algorithm 1: Masked PGD Attack: N number of iterations for PGD, S number of examples in dataset, T number of mask iterations

--- for n = 1...S do
    for i = 1...N do
        $\delta_{avg} = 0$
        for j = 1...T do
            // Compute a random mask for logits of $f_\theta$
            M = random mask
            // Apply mask, M to model output
            $x_p = f_\theta(x) \cdot M$
            $\delta = \delta + \alpha \cdot \text{sign}(\nabla_\delta \ell(x_p + \delta), y)) \delta_{avg} = \delta_{avg} + \max(\min(\delta, \epsilon), -\epsilon)$
        end
    end
    // Average the deltas found from random masks
    $\delta_{avg} = \delta_{avg}/T$
end

---

Algorithm 1 runs T additional iterations with a randomly generated mask (M) over the logits of the class output. Randomly masking classes makes it such that the adversary cannot rely on any "easy" classes (e.g., two different breeds of dog) to obtain successful attacks. This operation is in a manner mechanically similar to Dropout (Srivastava et al. 2014) and Expectation over Transformation (EoT) (Athalye et al. 2017). Unlike Dropout, however, the goal is to make the attacker more robust, and unlike EoT there is no differentiating through a defense of the victim (EoT's original purpose), but instead circumventing the adversary's uncertainty about the victim through simulation. The delta $\delta$ per the PGD attack is computed T times and then is averaged to have a more generalized delta, $\delta_{avg}$, that is not be dependent on $\mathcal{Y}^S$. This proves to be a better strategy for attacking the victim model with no guarantee of any of the surrogate model classes $\mathcal{Y}^S$ being present in victim's $\mathcal{Y}^V$.

A single model on CIFAR-100 takes on average 1.25 hours to train on a single graphics processing unit (GPU).

For each experiment, the surrogate model and the victim model must be trained from scratch. With each change in the number of classes shared and data, for CIFAR-100 looking at 5 number of classes each at 5 different percentages of data shared, the process creates 25 trains of the surrogate model and then 25 trains for the victim model. This totals in 50 total models, and totals to 62.5 hours for each training experiment. Due to the random selection of the shared classes and shared data, each experiment is run 5 times to account for outliers. The average of the performance for the 5 runs is done. This increases to 312.5 GPU hours in training. This is not including the total time it takes to run and find the attack on the victim network, which as will be explained, an extremely high number of iterations is taken to properly capture the potential of the attack for our thread model. This attack cost for the masked experiments take another ≈3,700 GPU hours due to the iterative attacks compounded by taking the expectation of the gradient. The results presented constitute months of compute capacity.

While previous works in adversarial machine learning are able to take use of pre-trained networks on ImageNet, due to the control for subsets of training data in the experimental studies discussed herein, the models must be trained from scratch on ImageNet with the varying levels of compute. Due to the nature of the study, re-training ImageNet is required to include it. It is estimated it would take 12 hours to train a Resnet-152 model on a subset of ImageNet. Taking this into account with the increase in classes to measure over, this scales to the experiment by taking 3,000 hours on only 5 steps of classes, 5 steps of percentage, and 5 runs to account for outliers. The attacks again would be even more expensive. As such, larger datasets like ImageNet are beyond the compute capacity to study.

The studies examined the success rate of transferring an attack to a victim model $V(\cdot)$ from a surrogate model $S(\cdot)$ with varying levels of shared tasks/data. Tasks are defined as shared-classes and data as the percentage of images within that intersection of shared-classes that both models are trained on. The training data is split based on the number of shared classes leaving the non-intersecting classes to be split between the two models. From the shared class data, a split is done based on a percentage shared. The two networks are then trained on each of these subsets.

The studies focused on CIFAR-100 since this dataset is larger, in terms of both classes and data, and diverse in the type of images and classes. This is a reasonable size for the extensive computational costs of experiments compared to ImageNet. Two variations are tested, one in which both surrogate and victim models are adversarially hardened during training and a novel variation of PGD attack in which classes are masked to increase generalization of transfer.

In summary, the studies involved:
An analysis of success of transfer from surrogate model to victim model at various levels of shared domains and data points.
Analysis of the effects adversarial hardening during training of both models has on the success based on varying levels of shared domains and data points.
A novel adversarial attack meant to generalize without relying on a single class present in the surrogate model using masking based targets.

A ResNet architectures (He et al. 2015), a ubiquitous backbone architecture, is used for all experiments. The size of model was matched to the size of dataset being learned. ResNet-18 is used for Fashion-MNIST, ResNet-50 for CIFAR-10, and Wide ResNet-50 for CIFAR-100. Each network is then modified to have a final linear layer that is only the size of the number of classes per model.

The models are trained using Adam optimizer (Kingma and Ba 2015) with a learning rate of 0.0004 selected on empirical results, with varying batch sizes based on dataset: 12 for Fashion-MNIST, 12 for CIFAR-10, and 128 for CIFAR-100. The number of epochs for each model is 10 for Fashion-MNIST, 20 for CIFAR-10, 200 for CIFAR-100. For CIFAR-100, a learning rate decay at epochs 60, 120, and 160 with gamma 0.2 is used.

Once each model is trained on the respected data-subset, a perturbation input $x^\sim = A(x)$ is found using PGD (Kurakin, Goodfellow, and Bengio 2017) by attacking the surrogate model $S(\cdot)$ with $L_\infty$ normalization and an $\epsilon$ of 0.3 with a PGD step size of 0.01. As many PGD steps as computationally feasible were used (Athalye, Carlini, and Wagner 2018). In the study, 1,000 steps were used, yet 100 steps is sufficient in most cases. The computed perturbation, A, is then applied from to the victim model, $V(\cdot)$. The success of the transferred attack is measured based on varying combinations of shared-classes and percentage shared. The results show that having less shared data has a non-trivial impact on attack success rate, and that fewer shared classes has a large impact on the adversary's estimate of attack success rate—and could lead to over/under confidence based on a computationally constrained attacker.

Within the threat model, it is necessary to account for the victim model creators attempting to mitigate the success of attacks, and attackers trying to create more robust attacks (Salman et al. 2020). This is done by performing adversarial training on both $S(\cdot)$ and $V(\cdot)$, and conducting the same grid of transfer attack testing, to determine how viable transfer attacks are when the adversary has the limited visibility of the specified threat model. Due to the number of train/test runs, the work of (Wong, Rice, and Kolter 2020) is used for computationally efficient hardening both networks during training. Within this method, the network is trained using a randomly initialized fast gradient sign method (FGSM) attack, which is found to be as effective as the PGD attack. The prior expectation is that this would significantly hamper the adversary, but the study's results show the drop in attack success rate is smaller than expected.

The masked PGD attacks are computationally too expensive to run to 1,000 PGD iterations, so only 250 iterations are done instead. This number appears to still be reasonable, and is tested by running the standard attack for only 250 PGD iterations. No difference in results are observed. It should be noted that in the masked PGD case, each iteration requires 100 sub-iterations (taking the expectation of the random mask M over the output space) for an effective total of 250,000 gradient calculations. Therefore, this decrease is a reasonable change (and ultimately a necessity due to extreme cost of experiments). It will be shown that this masked attack removes the number of shared classes as a source of variance, allowing the attacker to confidently estimate their attack success rate.

The success of an attack is defined as the original accuracy of the victim model subtracted by the accuracy on the transfer attacked samples. This gives a better heuristic than simply looking at the transfer attacked accuracy. Pearson product-moment correlation coefficient is used to measure the correlation between the two variables, number of classes shared and percentage of shared data. An analysis of variance (ANOVA) of the results is then examined. This allows for additional understanding of the dependence of success of transfer based on the individual factors and joint factors.

Figure 4A:
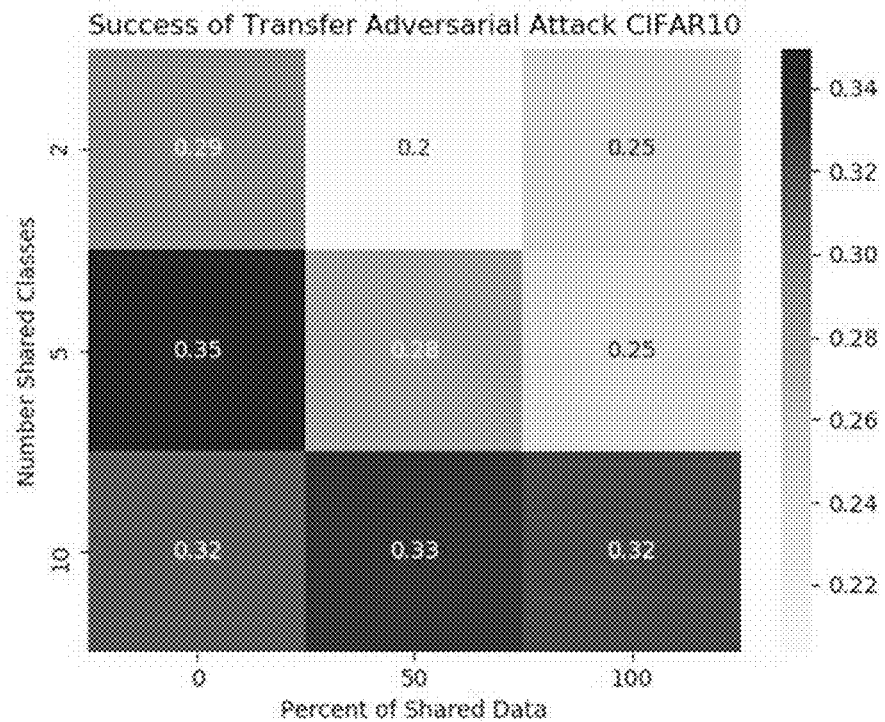
FIGS. 4A-4B show the success of a transfer attack dependent on variations of shared classes and percentage of data shared for two smaller datasets.
Figure 4B:
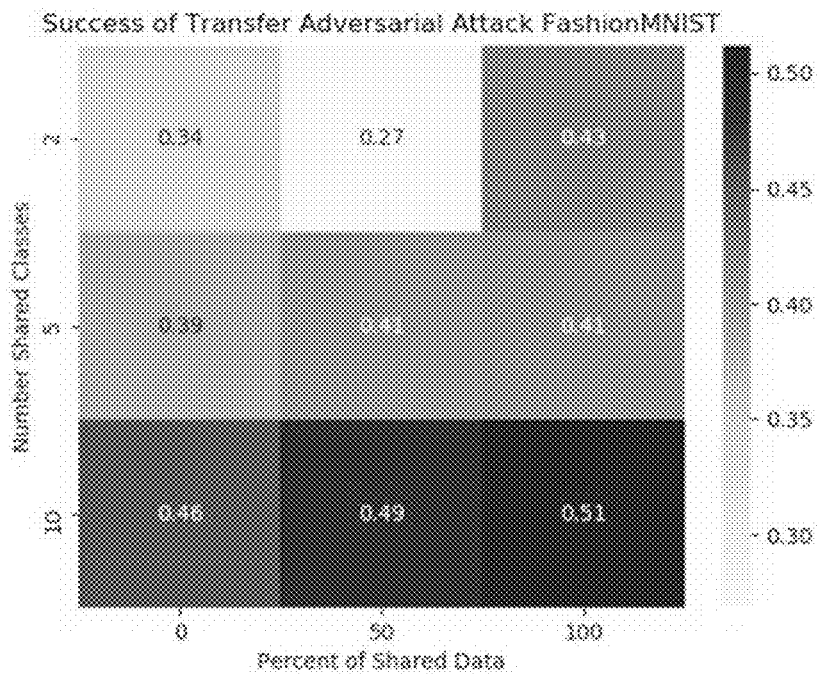

FIGS. 4A-4B show the success of a transfer attack dependent on variations of shared classes and percentage of data shared for two smaller datasets. For all datasets, the success of the transfer attack increases as the number of shared classes increases. For CIFAR-10 (FIG. 4A), the correlation coefficient is 0.2492 for number of shared classes and success rate and −0.1633 for percentage data shared. For FashionMNIST (FIG. 4B) the correlation coefficient is 0.5783 for shared classes, and 0.2280 for percentage shared data. Within these results on the smaller datasets, the number of shared classes is a similar indicator to the success of the attack while the correlation between shared percentages of data is the inverse between CIFAR-10 and FashionMNIST. Greater asperity is seen in the results and conclusions from these smaller datasets due to the small number of classes.

For our small datasets, testing just 2 classes makes sense. However, with CIFAR-100, overall high success is observed across the models only sharing 2 classes. This result is particularly perplexing. The variance of the success over the 5 separate runs was analyzed, and the analysis reveals that with the size of 460, the 95% confidence interval is ±0:312, making it difficult to draw any robust conclusion on behavior. This finding supports that there are complexities of vulnerability that emerge from the combination of classes and shared data that add a new dimension to the threat model, but is too computationally demanding to fully understand the variance in results. This itself is informative to the nature of the threat model when class overlap $\mathcal{Y}^X$ is small, and a need for variance reduction techniques. The study excluded runs with 2 shared classes from the correlation analysis, as this would require running 4,950 combinations to exhaustively look at the complexities of combining each class within the dataset. The CIFAR-100 results, as a whole, thus looks at a minimum of 25 shared classes.

Figure 5:
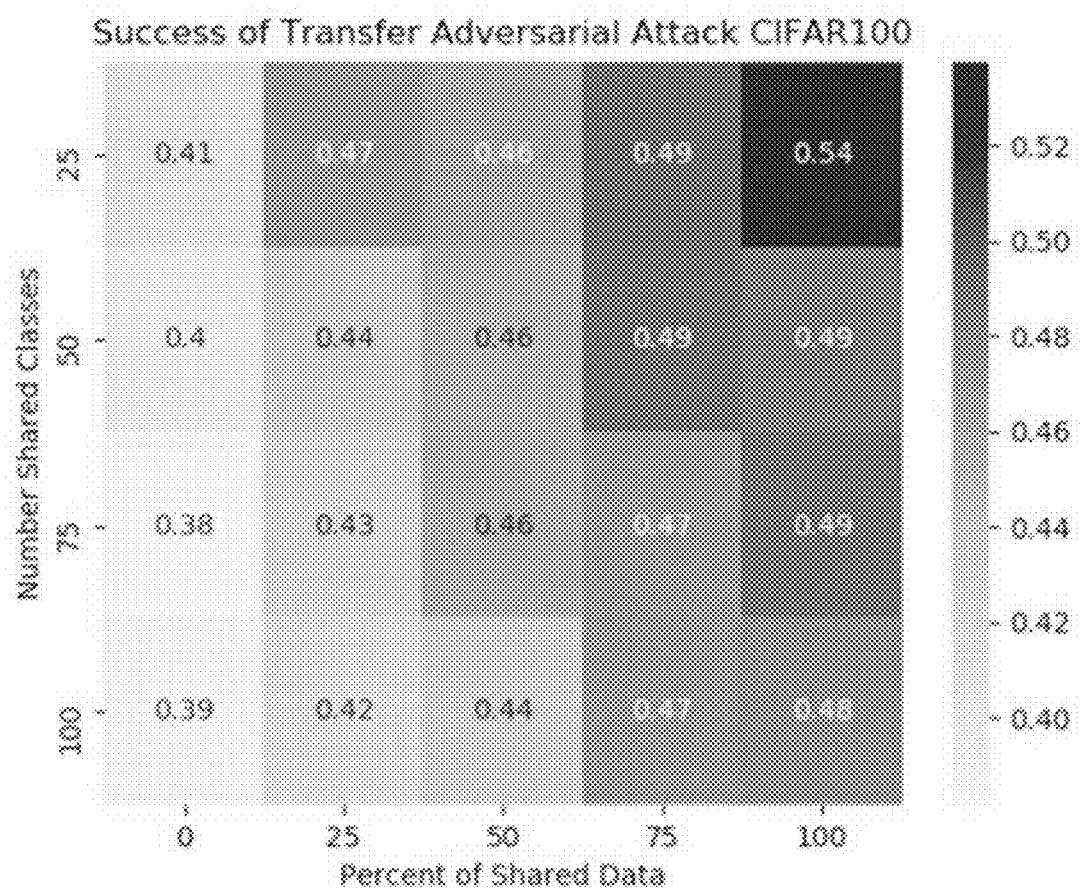
FIG. 5 shows the success of a transfer attack dependent on variations of shared classes and percentage of data shared for CIFAR-100.

FIG. 5 shows the success of a transfer attack dependent on variations of shared classes and percentage of data shared for CIFAR-100. With the CIFAR-100 experiments, there is a negative correlation based on shared classes of −0.3068 and a very strong positive correlation for the percentage of data shared of 0.8118. Overall these results are a contrast to the results of CIFAR-10 which has opposite trends with weaker correlation. An interesting result is that the CIFAR-10 and FashionMNIST models' transfer success rate dipped at 2 shared classes and 50% shared data. For other values of more shared classes, and more or less shared data, the success rate went back up. This appears to be an artifact of the smaller total number of classes in these tests and the natural variance in results. This hypothesis appears to bear out in the CIFAR-100 tests. With CIFAR-100, the success rate increases more so as the percentage of data shared increases. Within the models sharing 100% of all data, the model does not perform drastically better as the number of classes increased.

Overall high success is observed across the models only sharing 2 classes. This result is particularly perplexing. The consistent trend that having a smaller overlap $\mathcal{Y}^X$ appears to be largely a function of variance, rather than confidence. Analysis of the variance of the success over the 5 separate runs reveals that the standard deviation between runs for sharing 2 classes is double those with larger shared classes (see FIG. 6—showing standard deviation of success of transfer attack between 5 runs of each variation of shared classes and percentage of data shared for CIFAR100). This finding supports that there are complexities of vulnerability that emerge from the combination of classes and shared data that add a new dimension to the threat model. Importantly, this speaks to a lack of confidence (i.e., due to high variance and unknown $|\mathcal{Y}^X|$, the attacker cannot be sure of the transfer success rate) in results for the adversary A under this threat model. Since A does not know the size of the shared label space $\mathcal{Y}^X$, their own estimate of transfer success could be very precise (see uniformly loss variance for $\mathcal{Y}^X = \mathcal{Y}^S \cup \mathcal{Y}^V$ were all classes shared, regardless of the shared data size $\mathcal{D}_X$) or be off by ±0:13. This lack of confidence in transfer success rate would be an impediment to the attacker in actually performing their attack.

Figure 7:
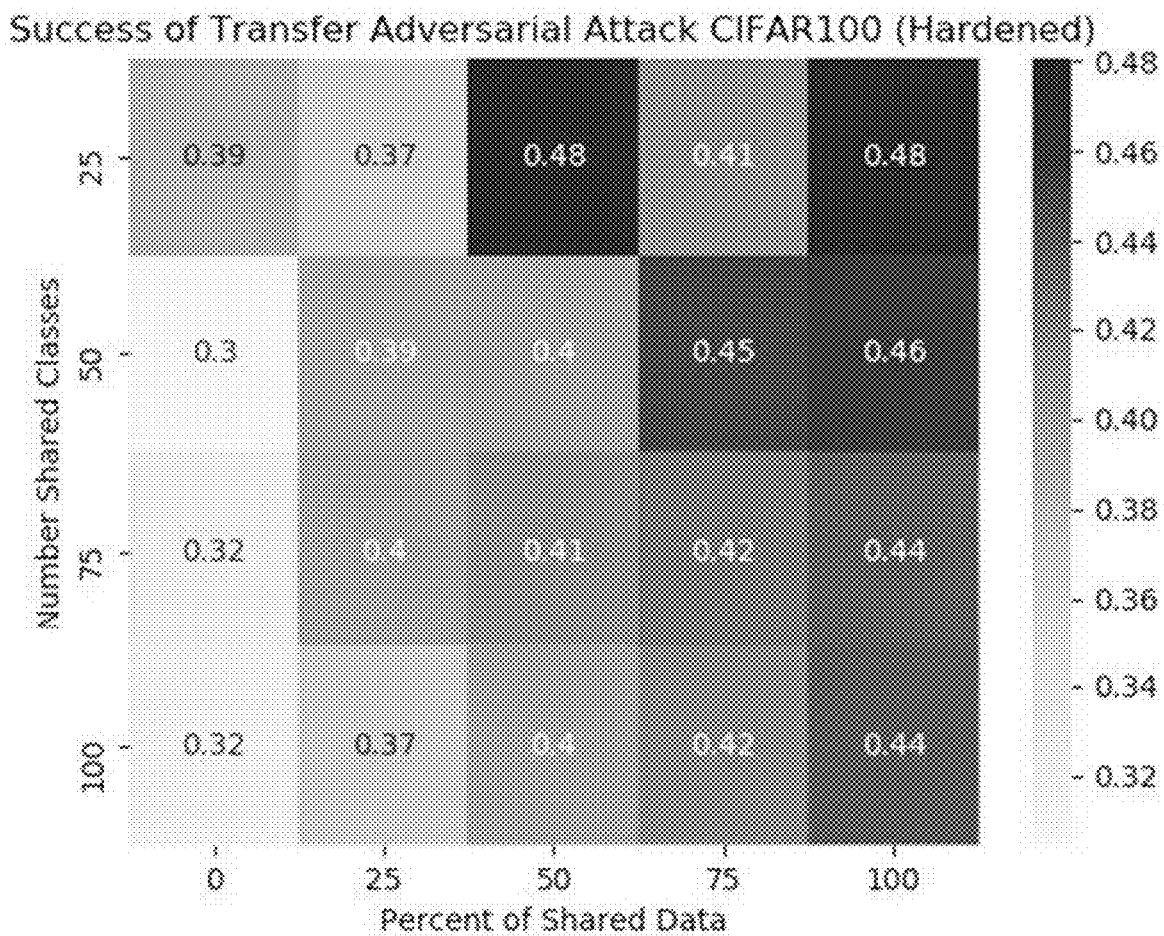
FIG. 7 shows the success of transfer attack on adversarially hardened model dependent on variations of shared classes and percentage of data shared for CIFAR-100.

FIG. 7 shows the success of transfer attack on adversarially hardened model dependent on variations of shared classes and percentage of data shared for CIFAR100. Overall, adversarial hardening did not dramatically decrease the success of the transfer attack. There is a larger difference with the success of the attack on the surrogate model itself (i.e., before transfer) opposed to the non-hardened version. This may be due to the data-specificity of hardening, which under normal circumstances is still considered state-of-the-art (Athalye, Carlini, and Wagner 2018; Wong, Rice, and Kolter 2020).

After each model is trained with adversarial hardening with their respected amount of overlap, the success of the transfer attack to the victim is found to be less with an average percentage decrease of 11%. The correlation changes for shared classes to −0.2675 and for the percentage of shared data to 0.8349. The correlation remains almost equal for the percentage of shared data, and the correlation for the number of shared decreases 42%.

This gives insight into the success of transfer, which is lowered but the percentage of data has a stable correlation to success despite it. Similar to prior work, it is observed that adversarial hardening has a positive overall effect on the success of protecting the victim model. It should be noted that this hardening can help to protect against attacks based on shared classes but not on shared percentage of data.

Figure 6:
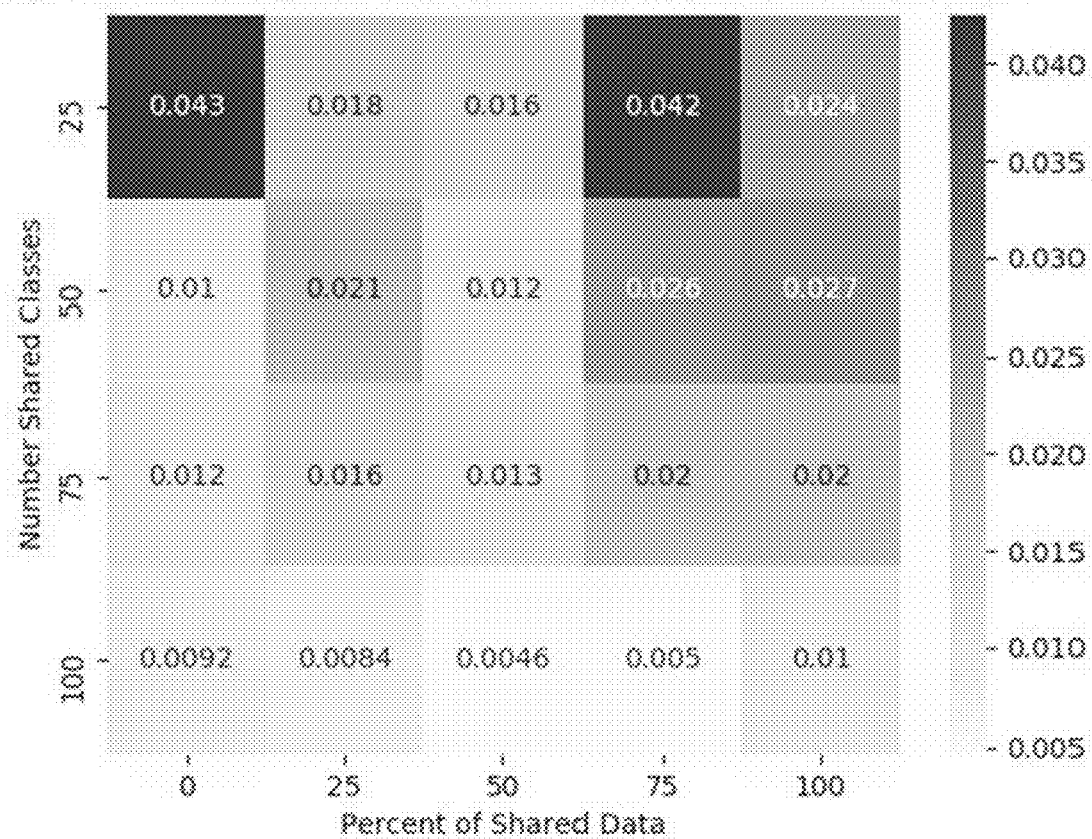
FIG. 6 shows standard deviation of success of transfer attack between 5 runs of each variation of shared classes and percentage of data shared for CIFAR-100.
Figure 8:
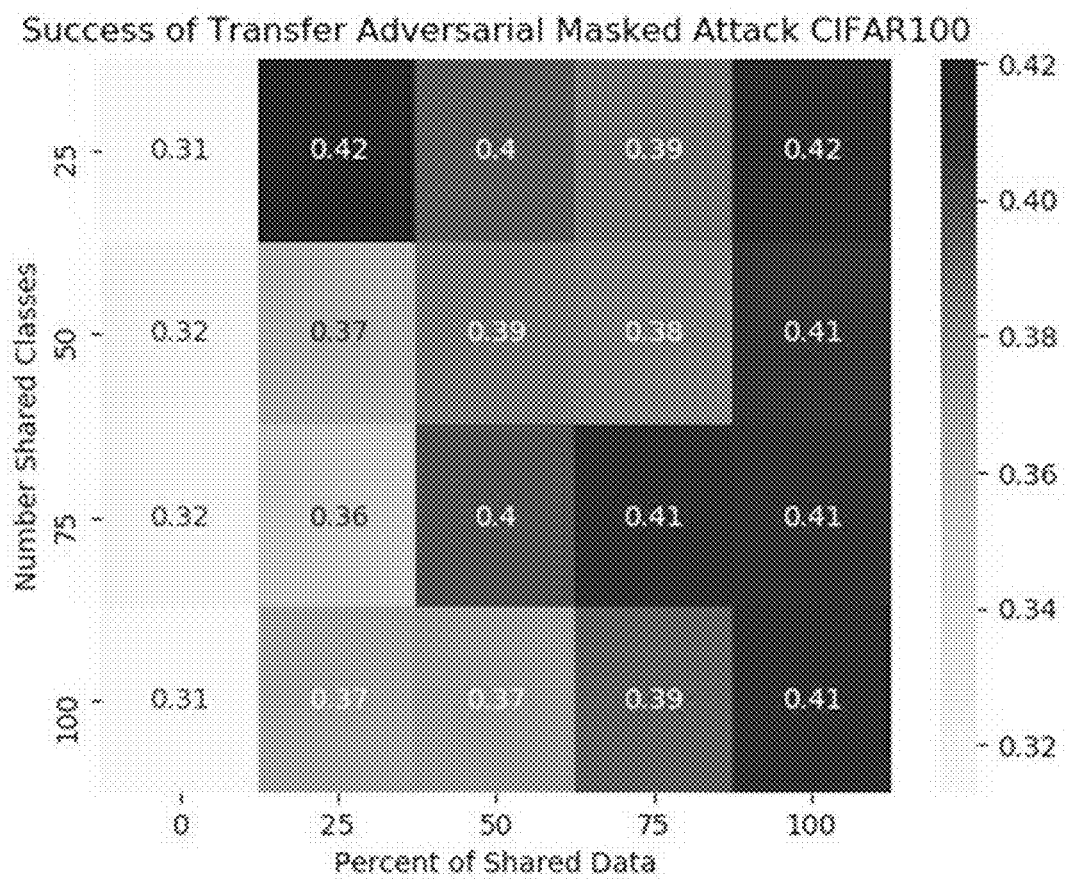
FIG. 8 shows the success of masked transfer attack dependent on variations of shared classes and percentage of data shared for CIFAR-100.

FIG. 8 shows the success of masked transfer attack dependent on variations of shared classes and percentage of data shared for CIFAR100. Adversarial hardening is used above to improve the adversary's confidence in attack success rate in the face of uncertainty of the class overlap. Because they do not know the degree of $\mathcal{Y}^X|$, they cannot determine if they have a high or low variance in transfer success rate that depends on the number of shared classes as shown in FIG. 6. To make the adversary confident that their attacks will transfer (and thus, willing to perform the attack), this variance should be reduced. This can be achieved using the masked PGD attack to simulate the surrogate attacking a model with a differing subset of shared labels. Due to the variation of the subset with sharing 2 classes discussed above, these results are excluded from the analysis of the experiments. With a more generalized attack, the attack overall saw more success across number of shared classes. It should be noted that there is a correlation of −0.1129 for the shared classes and 0.8341 for the shared data percentage A drastic decrease in correlation of the success of the attack and the number of shared classes is observed. A ≈75% decrease in correlation from a standard transfer attack is observed. This makes the shared data $\mathcal{D}_X$ the only significant factor in attack success rate, allowing the adversary to reliably estimate their attack success rate.

While the attack success rate did not necessarily increase overall in attack, this could be in part because the overall outer loop of the attack is run only 25% of the times that the standard attack is, while getting within on average 7% of the transfer success that the attack that is run for 1,000 iterations obtained.

To level the analysis, a standard attack is run with only 250 iterations, equal to that of the masked attack. This does not change the results, with the Masked PGD attack still less effective at transferring attacks by the same amount. Overall, the results indicate that the adversary can overcome the uncertainty of class overlap $\mathcal{Y}X$ to make an informed choice on attacking or not.

The studies discussed herein elucidate a data-centric threat model where the adversary cannot query the victim, but must still transfer evasion attacks using a surrogate. Many prior works have implicitly used this model, with the unrealistic setting of the adversary knowing all the exact data used by the victim. Embodiments described herein, however, are applicable to many real-world situations, and provides for the first time the nature and magnitude of attack success rate as the amount of shared data and classes vary. Having less shared data always has a negative impact on attack success, and fewer shared classes cause increases variability in attack success rate, making it difficult for the adversary to understand their likelihood of success. These results hold even with adversarially trained models. Moreover, the inventors developed a masked PGD attack that lets the adversary overcome the increase in variance so they can confidently estimate attack success rate.

It will be understood that modifications to the embodiments disclosed herein can be made to meet a particular set of design criteria. For instance, any of the system components or method steps can be any suitable number or type of each to meet a particular objective. Therefore, while certain exemplary embodiments of the system and methods of using the same disclosed herein have been discussed and illustrated, it is to be distinctly understood that the invention is not limited thereto but can be otherwise variously embodied and practiced within the scope of the following claims.

It will be appreciated that some components, features, and/or configurations can be described in connection with only one particular embodiment, but these same components, features, and/or configurations can be applied or used with many other embodiments and should be considered applicable to the other embodiments, unless stated otherwise or unless such a component, feature, and/or configuration is technically impossible to use with the other embodiment. Thus, the components, features, and/or configurations of the various embodiments can be combined together in any manner and such combinations are expressly contemplated and disclosed by this statement.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein. Additionally, the disclosure of a range of values is a disclosure of every numerical value within that range, including the end points.

What is claimed is:

1. A system for generating a transfer adversarial attack, the system comprising:
    an attack module configured to generate an adversarial attack on a target module, wherein the attack module is configured to:
        generate a surrogate model having an architecture and a dataset that mirrors at least one aspect of a target model of the target module, the surrogate model including a plurality of classes;
        generate a masked version of the surrogate model having fewer classes than the surrogate model by randomly selecting at least one class of the plurality of classes for removal;
        attack the masked surrogate model to create a perturbed sample;
        generalize the perturbed sample for use with the target module; and
        transfer the perturbed sample to the target module to alter an operating parameter of the target model.

2. The system of claim 1, wherein:
the attack module includes program instructions stored within a memory having an algorithm as follows:

```
for n = 1...S do
    for i = 1...N do
        δ_avg = 0
        for j = 1...T do
            // Compute a random mask for logits of f_θ
            M = random mask
            // Apply mask, M to model output
            x_p = f_θ (x) · M
            δ = δ + α · sign(∇_δ ℓ (x_p + δ), y)) δ_avg = δ_avg + max(min(δ, ε), -ε)
        end
    end
    // Average the deltas found from random masks
    δ_avg = δ_avg /T
end
``` wherein:
   S=total number of data points to attack;
   N=number of times to perturb each data point;
   $\delta_{avg}$=one of N perturbations to a data point;
   T=number of mask iterations;
   $x_p$=the result or output of the surrogate model;
   $f_\theta$=a machine learning model; θ=parameters of the machine learning model;
   δ=a current perturbation;
   α=a constant;
   ε=a constant;
   $\nabla_\delta$=the computed gradient with respect to δ perturbation;
   l=a loss function; and
   Y=a class of data.

3. The system of claim 2, wherein:
N>=1,000; and
T>=100.

4. The system of claim 2, wherein:
α=represents a learning rate.

5. The system of claim 2, wherein:
ε is a value that bounds the algorithm to limit perturbation of data for the perturbed sample.

6. The system of claim 5, wherein:
ε is set to limit perturbation of data so that the perturbed sample is undetectable but causes the altered the operating parameter in the target model.

7. The system of claim 1, wherein:
the attack module is configured to generate the surrogate model having a characteristic of the surrogate model architecture and dataset that matches a characteristic of the target model architecture and dataset; and
the degree of matching between the architecture of the surrogate model and the architecture of the target model is greater than the degree of matching between the dataset of the surrogate model and the dataset of the target model.

8. The system of claim 1, wherein:
the attack on the masked surrogate model is a projected gradient descent attack.

9. The system of claim 1, wherein:
the target model has an architecture and a dataset, the dataset including a training dataset based on machine learning or deep learning.

10. A method for transferring an adversarial attack, the method comprising:
generating a surrogate model having an architecture and a dataset that mirrors at least one aspect of a target model of a target module, the surrogate model including a plurality of classes;
generating a masked version of the surrogate model having fewer classes than the surrogate model by randomly selecting at least one class of the plurality of classes for removal;
attacking the masked surrogate model to create a perturbed sample;
generalizing the perturbed sample for use with the target module; and
transferring the perturbed sample to the target module to alter an operating parameter of the target model.

11. The method of claim 10, wherein:
generating the masked version of the surrogate model involves implementation of the following algorithm:

```
for n = 1...S do
    for i = 1...N do
        δ_avg = 0
        for j = 1...T do
            // Compute a random mask for logits of f_θ
            M = random mask
            // Apply mask, M to model output
            x_p = f_θ (x) · M
            δ = δ + α · sign(∇_δ ℓ (x_p + δ), y)) δ_avg = δ_avg + max(min(δ, ε), -ε)
        end
    end
    // Average the deltas found from random masks
    δ_avg = δ_avg /T
end
``` wherein:
S=total number of data points to attack;
N=number of times to perturb each data point;
$\delta_{avg}$=one of N perturbations to a data point;
T=number of mask iterations;
$x_p$=the result or output of the surrogate model;
$f_\theta$=a machine learning model; $\theta$=parameters of the machine learning model;
$\delta$=a current perturbation;
$\alpha$=a constant;
$\varepsilon$=a constant;
$\nabla_\delta$=the computed gradient with respect to $\delta$ perturbation;
l=a loss function; and
Y=a class of data.

12. The method of claim 11, wherein:
N>=1,000; and
T>=100.

13. The method of claim 11, wherein:
α=represents a learning rate.

14. The method of claim 11, wherein:
ε is a value that bounds the algorithm to limit perturbation of data for the perturbed sample.

15. The method of claim 11, wherein:
ε is set to limit perturbation of data so that the perturbed sample is undetectable but causes the altered the operating parameter in the target model.

16. The method of claim 10, wherein:
the surrogate model has a characteristic of the surrogate model architecture and dataset that matches a characteristic of the target model architecture and dataset; and
the degree of matching between the architecture of the surrogate model and the architecture of the target model is greater than the degree of matching between the dataset of the surrogate model and the dataset of the target model.

17. The method of claim 10, wherein:
attacking the masked surrogate model is via a projected gradient descent attack.

18. The method of claim 17, comprising:
developing a defense model based on the attack on the target module.

19. The method of claim 10, wherein:
the target model has an architecture and a dataset, the dataset including a training dataset based on machine learning or deep learning.

20. The method of claim 10, comprising:
estimating a likelihood of success for the attack on the target module.

* * * * *